Patented June 4, 1946

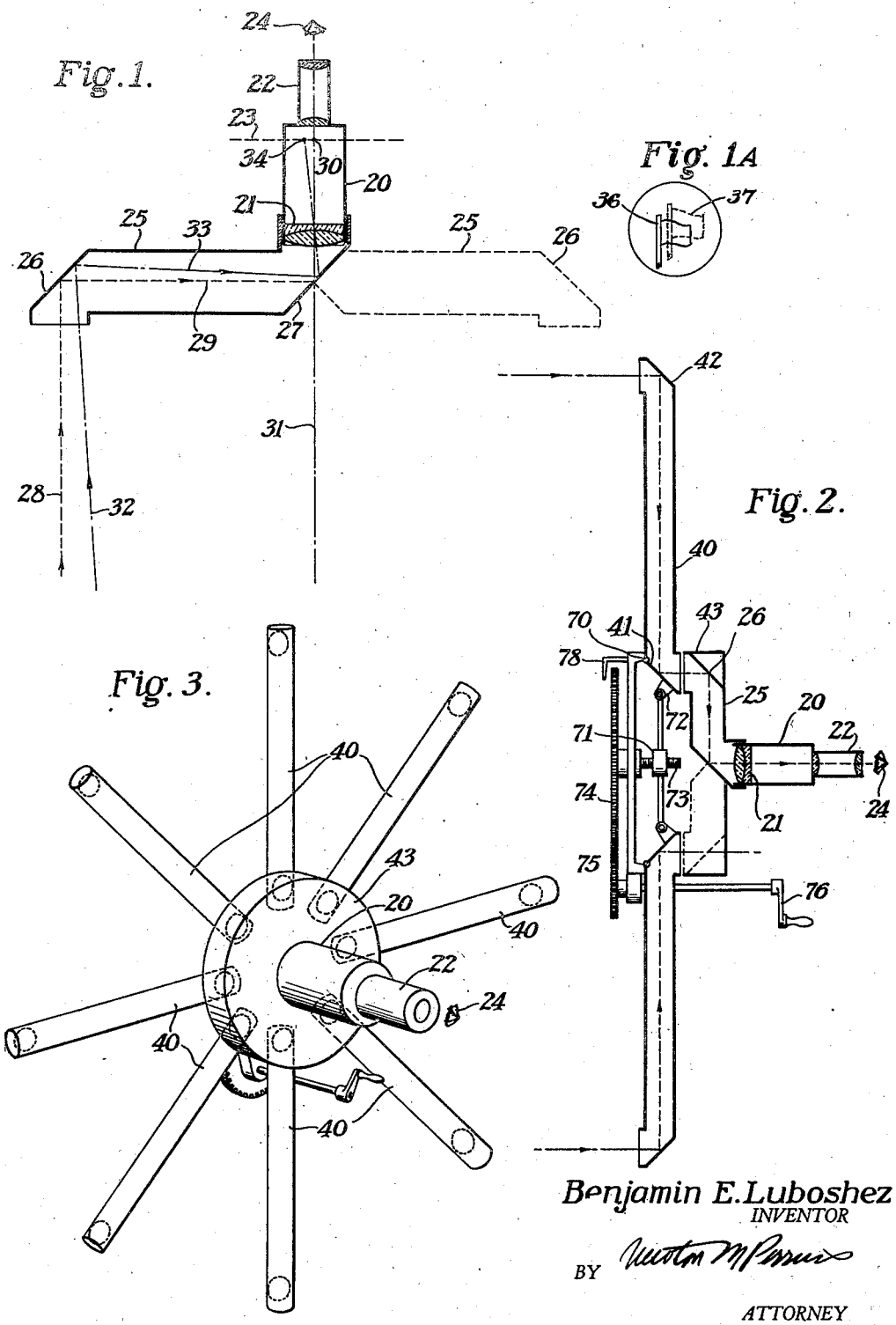

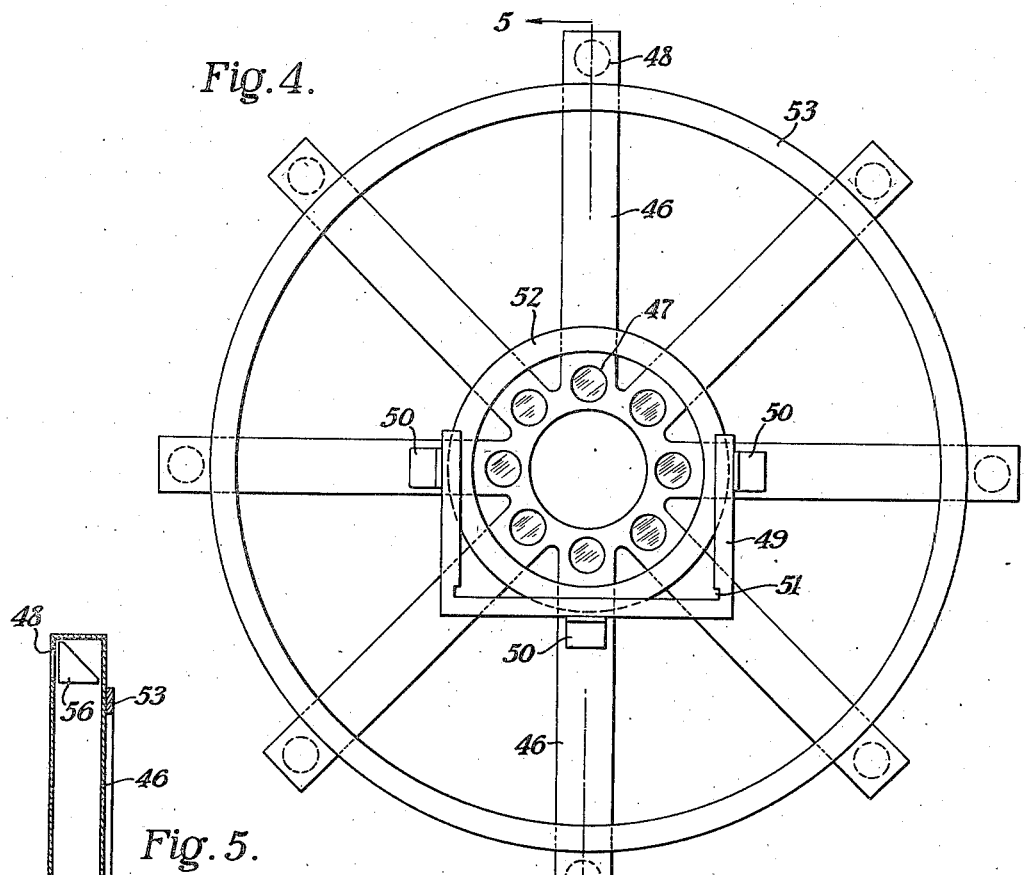
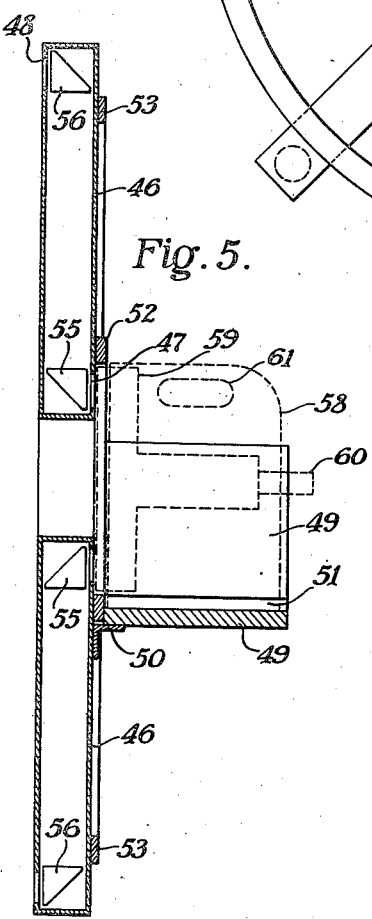
Benjamin E. Luboshez
INVENTOR

2,401,689

UNITED STATES PATENT OFFICE 2,401,689

LONG BASE RANGE FINDER

Benjamin E. Luboshez, Rochester, N. Y., assignor to Eastman Kodak Company, Rochester, N. Y., a corporation of New Jersey Application July 18, 1941, Serial No. 402,983

6 Claims. (Cl. 88—2.7)

This invention relates to range finders and specifically to a modification of moving viewpoint range finders described in my application, Serial No. 402,982, filed concurrently herewith.

It is the object of this modification to give increased accuracy without having increased size of the moving parts of the apparatus. It is also an object of the invention to permit interchangeable use of different base lengths in the range finder, while using the same moving parts.

The moving parts of a moving viewpoint range finder must be accurately made and assembled. The difficulty of making large moving parts such as the rotor with sufficient accuracy is avoided by the present invention which involves a small centrally located rotor (or less preferably a pendulum) and a series of radially oriented fixed periscopes whose outer windows face the object and whose inner windows successively deliver light to the rotor as it sweeps past. The present embodiment utilizes all of the features of the moving viewpoint range finders described in my copending application mentioned above. It utilizes small but finitely extended arcuate portions of the viewpoint path.

This long base, fixed periscopes feature is also applicable to the range finders described in my applications Serial Nos. 402,984, 402,985 and 402,-986, all filed concurrently herewith.

The invention, its objects and advantages will be fully understood from the following description when read in connection with the accompanying drawings, in which:

Fig. 1 illustrates the principle of moving viewpoint range finders.

Fig. 1A shows the field of view as seen through the instrument.

Fig. 2 is a vertical section, and Fig. 3 is a perspective view of one embodiment of the invention.

Fig. 4 is a rear view, and Fig. 5 is a vertical section of an embodiment of the invention permitting interchangeable base lengths.

In Fig. 1 a range finder having a housing 20 is provided with an objective 21 for forming in its focus plane 23, which is also the focus plane of an eyepiece 22, an image of the object whose range is to be found. If one considers only objects on the rotation axis 31 which in this figure corresponds to the optic axis of the objective, the eye 24 sees for objects at infinity an image 30 formed by the rays 28 and 29. A near-by object, by rays 32 and 33 similarly forms an image 34. Mounted on the front of the range finder 20 is a rotating arm 25 having reflecting surfaces 26 and 27 for reflecting the rays as just described. As this rotating arm is rotated for example to the position shown by broken lines, the image 34 rotates about the optic axis. For all other objects at the same distance from the instrument, but not on the optic axis, the image points similarly rotate with a circular motion, but the image as a whole does not rotate. If some adjustable wedge, not shown, is provided to rotate with the rotating arm 25, or if the mirror 27 or the mirror 26 is made adjustable, the point 34 may be deflected until it coincides with the optic axis 31. In this case the rotation of the rotating arm 25 no longer causes a circular motion of the image in the image plane 23. Thus the degree of adjustment of the light deflecting means, is a measure of the range. All of this is described in connection with my copending application mentioned above.

While it is desirable to have the image remain continuously on the image plane 23 as the rotating arm 25 is rotated, it is not absolutely necessary to do so especially if the image remains always upright or always inverted. Thus an intermittent image would for most purposes not be objectionable.

In Fig. 1A is shown the field of view when ranging on a flag, for example. When the instrument is operated, the image 36 rotates without changing its orientation until the instrument is adjusted to eliminate this motion. If a fixed image such as shown by broken lines 37 is superpositioned on the field, as in certain embodiments described in the parent application mentioned above, the image 36 rotates about this fixed image 37.

Fig. 2 shows an arrangement producing intermittent images but having greatly increased sensitivity with no increase in size of the rotor. In this Fig. 2 the range finder described in connection with Fig. 1 is mounted behind a series of radially disposed periscopes of equal length. These periscopes have rigid housings 40, inner reflectors 41 adjacent to their exit windows, and outer reflectors 42 adjacent to their entrance windows. The rotating arm 25 is carried by a rotor 43 and as it is rotated, it successively picks up light from the exit windows of the periscopes. A succession of images is thus formed on the focus plane of the objective 21. These images are all superimposed in register if suitable light deviating devices either in the rotor or in the periscopic systems are provided and adjusted to eliminate the image motion. Otherwise the images are spaced and appear to move with a circular motion.

In this particular embodiment, the adjustment or control of the image movement is obtained by simultaneously and similarly adjusting all of the periscopes. The inner reflectors 41 are rotatably mounted on pivots 70 and are simultaneously adjusted by movement of a nut 71 engaging studs 72 extending respectively from the inner end of each reflector 41. Thus nut 71 moves on a screw 73 which is turned by a spur gear 74 engaging a pinion 75, driven by a crank 76 conveniently located immediately in front of the observer.

The adjustment in terms of object range is read by a pointer 78 cooperating with a scale on the spur gear 74. For operation, the rotor 43 is rotated and the crank 76 turned until there is no apparent motion of the image whose range is to be found and then the range read off against the pointer 78.

For convenience the outer windows of the periscopes are said to face forward and the inner ends to face in one horizontal direction but these terms are relative and do not necessarily refer to absolute orientation in space.

In Figs. 4 and 5 the periscopes 46 with inner windows 47 and outer windows 48 are supported on rings 52 and 53, and by means of brackets 50 carry a frame 49 having alignment grooves 51 near the base thereof. In the periscopes 46 prisms 55 and 56 are mounted immediately behind the windows 47 and 48. The prisms 55 and 56 are shown simple for convenience by in practice are replaced by pentagon prisms. This particular arrangement is adapted for use with a range finder of the type described in my copending application mentioned above and when different sensitivities are required, different sets of periscopes are provided for use with the same rotor. The range finder 58 having a rotor 59 and eyepiece 60 is carried by a handle 61 and may be aligned with the axis of symmetry of the radially disposed periscopes 46 by means of the grooves 51. The use of a single size rotor with different base lengths provided by different sets of periscopes requires separate scales or separate calibrations for each base length.

A careful consideration of the various reflections involved will show that there is no rotation of the image in the image plane even as the rotor reflector sweeps past the inner window of each of the periscopes. Whether the rotor is fixed to the periscopes or interchangeable periscopes are used, the rotor, compensating wedge, etc. can have any of the forms described in the copending applications mentioned above.

Having thus described various embodiments of this invention, I wish to point out that it is not limited to the structures shown but is of the scope of the appended claims.

What I claim and desire to secure by Letters Patent of the United States is:

1. A range finder comprising a support, a plurality of periscopes of equal length radially mounted on the support with their outer ends facing forward and their inner ends all facing in one horizontal direction, means carried on the support for focusing in a fixed image plane and by light successively through the periscopes, images of the object whose range is to be found, adjustable means carried on the support for controlling the distances between the successive images and scale means for indicating the adjustment of the control means when said distances are reduced to zero.

2. A range finder comprising a support, a plurality of periscopes of equal length radially mounted on the support with their outer ends facing forward and their inner ends all facing in one horizontal direction, a rotor carried by the support and rotatable about a horizontal axis concentric to said outer and inner ends, a reflector carried by the rotor and positioned to receive light successively from said inner ends as the rotor is rotated and to reflect it inward, a second reflector carried by the rotor approximately parallel to the first one and on said axis to reflect the light horizontally to a vertical image plane, means including the periscopes and the two reflectors for focusing in said image plane and by light successively through the periscopes as the rotor is rotated, images of the object whose range is to be found, adjustable means carried on the support for controlling the distances between the successive images and scale means for indicating the adjustment of the control means when said distances are reduced to zero.

3. A range finder according to claim 2 in which the focusing means includes only one objective which is aligned on said axis between the second reflector and the image plane which is the focus plane of the objective.

4. A range finder according to claim 2 in which the control means is coupled to the periscopes to adjust simultaneously for all the periscopes, the angles between the rays incident on the outer ends and the corresponding rays transmitted through the inner ends.

5. A range finder according to claim 2 in which the control means is carried by and is rotatable with the rotor in the light beam between said inner ends and the image plane.

6. A range finder according to claim 2 including a housing for the rotor and encompassing said image plane, means carried on the housing for viewing the image plane and means on the support for detachably holding the housing with the rotor aligned on said horizontal axis.

BENJAMIN E. LUBOSHEZ.